(12) United States Patent
Stelmar Netto et al.

(10) Patent No.: US 11,126,646 B2
(45) Date of Patent: Sep. 21, 2021

(54) IMPLICIT AND EXPLICIT COGNITIVE ANALYSES FOR DATA CONTENT COMPREHENSION

(71) Applicant: International Business Machines Corporation, Armonk, NY (US)

(72) Inventors: Marco Aurelio Stelmar Netto, Sao Paulo (BR); Nilo Freitas de Resende, Sao Paulo (BR); Elias de Carvalho, Jr., Sao Paulo (BR); Daniel de Castro Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/741,421

(22) Filed: Jan. 13, 2020

(65) Prior Publication Data

US 2021/0216579 A1    Jul. 15, 2021

(51) Int. Cl.
*G06F 17/00* (2019.01)
*G06F 16/34* (2019.01)
(Continued)

(52) U.S. Cl.
CPC ............ *G06F 16/345* (2019.01); *G06F 3/013* (2013.01); *G06F 11/3438* (2013.01);
(Continued)

(58) Field of Classification Search
CPC ...... G06F 40/166; G06F 16/345; G06F 3/013; G06F 40/103; G06F 11/3438; G06F 40/40; H04L 67/125; G06K 9/00302; G06N 5/02
(Continued)

(56) References Cited

U.S. PATENT DOCUMENTS

| | | | |
|---|---|---|---|
| 7,395,501 B2 * | 7/2008 | Graham | G06F 16/40 715/254 |
| 2012/0210203 A1 * | 8/2012 | Kandekar | G06F 15/0291 715/230 |

(Continued)

OTHER PUBLICATIONS

Sahoo et al., "Aspect Based Multi-Document Summarization," 2016 International Conference on Computing, Communication and Automation (ICCCA2016), 5 pages.
(Continued)

*Primary Examiner* — Stephen S Hong
*Assistant Examiner* — Matthew J Ludwig
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) monitors, via sensor(s) configured to monitor physical behaviors of a user engaged in reading document(s) on a user interface of a client, where the monitoring captures the physical behaviors and portions of the one or more processors being read during the physical behaviors. The processor(s) analyses the physical behaviors and the captured portions to generate implicit feedback indicating amounts of time the user engaged with each portion of the one or more documents during the monitoring. The processor(s) generates a model profile for the user including relative timing measures indicating ranked levels of engagement of the user with the portions and ranked levels of importance of each portion.

18 Claims, 10 Drawing Sheets

(51) Int. Cl.
*G06F 40/103* (2020.01)
*G06F 40/40* (2020.01)
*G06K 9/00* (2006.01)
*G06N 5/02* (2006.01)
*G06F 3/01* (2006.01)
*G06F 11/34* (2006.01)

(52) U.S. Cl.
CPC ............ *G06F 40/103* (2020.01); *G06F 40/40* (2020.01); *G06K 9/00302* (2013.01); *G06N 5/02* (2013.01)

(58) Field of Classification Search
USPC .................................................. 715/255, 254
See application file for complete search history.

(56) References Cited

U.S. PATENT DOCUMENTS

| | | | | |
|---|---|---|---|---|
| 2013/0205203 | A1* | 8/2013 | MacDougall | G06F 40/169 715/256 |
| 2014/0188766 | A1* | 7/2014 | Waldman | G06Q 30/0255 705/400 |
| 2014/0280944 | A1* | 9/2014 | Montgomery | H04L 67/125 709/225 |
| 2014/0331125 | A1* | 11/2014 | Tigchelaar | G06F 40/103 715/249 |
| 2015/0212977 | A1* | 7/2015 | Dasgupta | G06F 40/258 715/254 |
| 2015/0331553 | A1* | 11/2015 | Shaffer | G06Q 30/0242 715/765 |
| 2016/0048901 | A1* | 2/2016 | Bax | G06F 16/90324 705/26.62 |
| 2017/0213130 | A1* | 7/2017 | Khatri | G06F 16/345 |
| 2017/0330095 | A1 | 11/2017 | Lindsley | |
| 2018/0174060 | A1* | 6/2018 | Velez-Rojas | H04W 4/02 |
| 2018/0197575 | A1* | 7/2018 | Doherty | G06F 3/0485 |
| 2020/0026772 | A1* | 1/2020 | Wheeler | G06F 16/9535 |
| 2020/0314490 | A1* | 10/2020 | el Kaliouby | H04N 21/25866 |
| 2021/0149968 | A1* | 5/2021 | Zhernov | G06F 16/93 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

IMPLICIT AND EXPLICIT COGNITIVE ANALYSES FOR DATA CONTENT COMPREHENSION

BACKGROUND

Reading documents in order to understand the key points, even with the benefit of speed reading techniques, can be time intensive and hence, expensive. As the number of documents increases based on, for example, the prevalence of instantaneous electronic communications, being able to handle the volume of documents for a given project becomes more challenging. At times, various companies will even outsource this work with documents to other professionals, such as document engineers, and given the time and resources needed, the cost of a project can be impact heavily based on the need to digest all these documents. In some situations, the reason behind extracting the substance of documents is to input it into another system, so that the content can be further parsed and analyzed, electronically. However, the manual labor generally needed to make this automated analysis possible is often both time-consuming which can increase both the cost and the timeline of a project.

SUMMARY

Shortcomings of the prior art are overcome and additional advantages are provided through the provision of a method for automatically summarizing documents. The method includes, for instance: monitoring, by one or more processors, via the one or more sensors, the one or more sensors configured to monitor physical behaviors of a user engaged in reading one or more documents on a user interface of a client communicatively coupled to the one or more processors, the physical behaviors and portions of the one or more processors being read during the physical behaviors; analyzing, by the one or more processors, the physical behaviors and the captured portions to generate implicit feedback indicating amounts of time the user engaged with each portion of the one or more documents during the monitoring; and generating, by the one or more processors, a model profile for the user, wherein the profile comprises relative timing measures indicating ranked levels of engagement of the user with the portions and ranked levels of importance of each portion, wherein each level of engagement is directly proportional to each level of importance of each portion being reviewed at the level of engagement in a context of the one or more documents.

Shortcomings of the prior art are overcome and additional advantages are provided through the provision of a computer program product for automatically summarizing document. The computer program product comprises a storage medium readable by a processing circuit and storing instructions for execution by the processing circuit for performing a method. The method includes, for instance: monitoring, by the one or more processors, via the one or more sensors, the one or more sensors configured to monitor physical behaviors of a user engaged in reading one or more documents on a user interface of a client communicatively coupled to the one or more processors, the physical behaviors and portions of the one or more processors being read during the physical behaviors; analyzing, by the one or more processors, the physical behaviors and the captured portions to generate implicit feedback indicating amounts of time the user engaged with each portion of the one or more documents during the monitoring; and generating, by the one or more processors, a model profile for the user, wherein the profile comprises relative timing measures indicating ranked levels of engagement of the user with the portions and ranked levels of importance of each portion, wherein each level of engagement is directly proportional to each level of importance of each portion being reviewed at the level of engagement in a context of the one or more documents.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
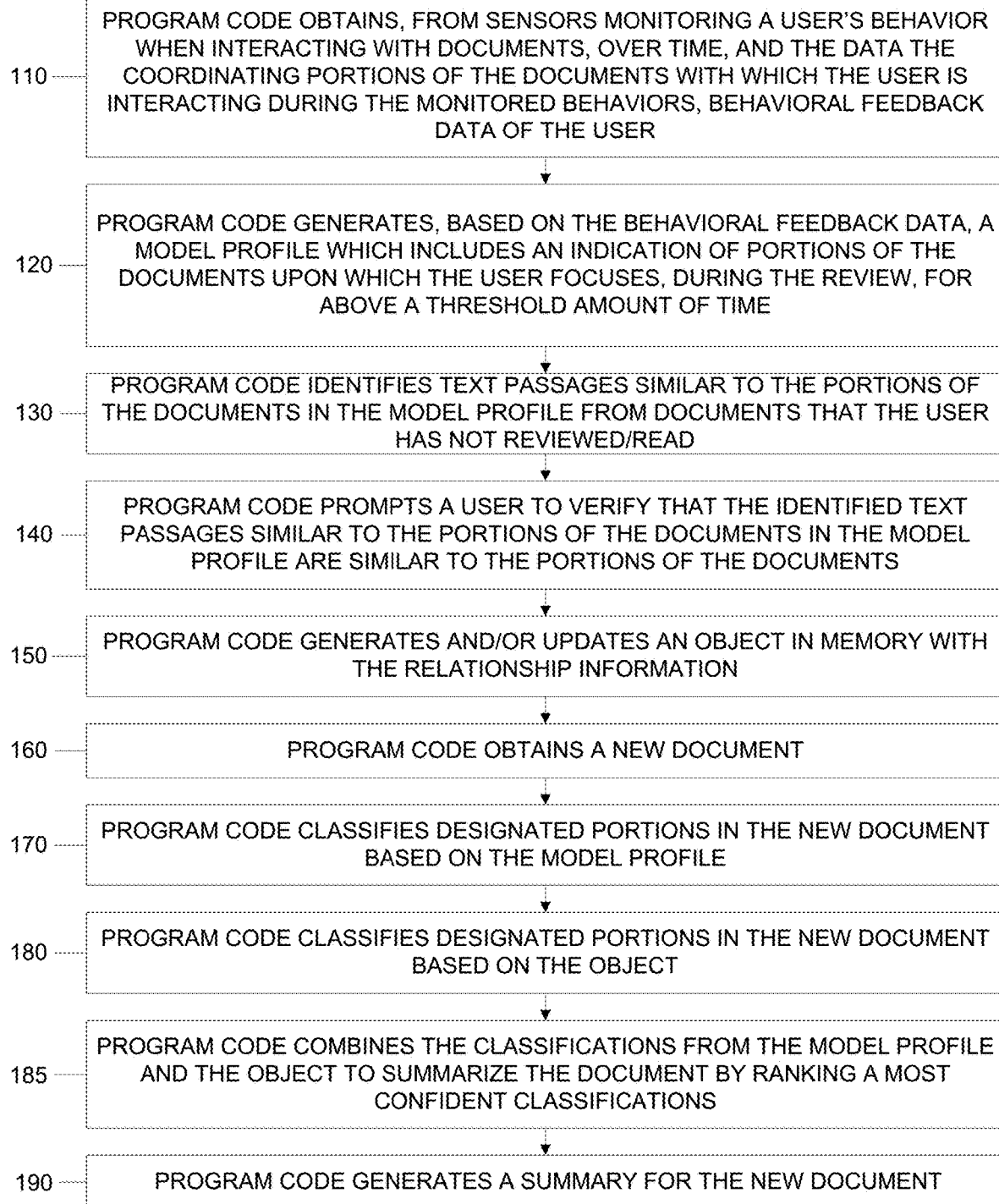
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 8:
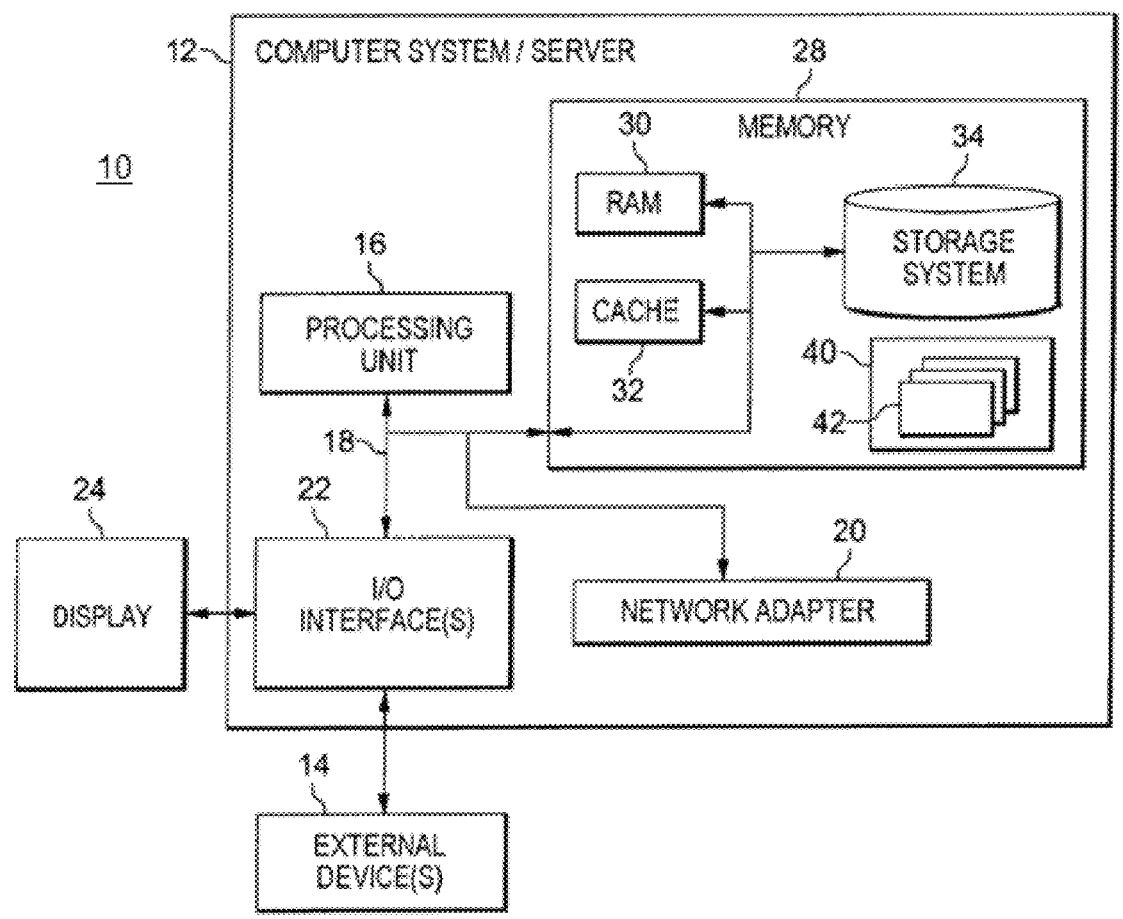
FIG. 8 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 8 as program/utility 40, having a set (at least one) of program modules 42, may be stored in memory 28.

Embodiments of the present invention include computer-implemented methods, computer program products, and computer systems that enable users, including but not limited to, document engineers, to obtain useful data from unknown documents more efficiently. This data can be utilized, after being obtained, for example, as parameters entered into artificial intelligence (AI) systems, for model training and machine learning. By accelerating the rate and quality at which data comprising documents can be digested, embodiments of the present invention provide improvements to the AI systems that utilize this data. As will be explained herein, in embodiments of the present invention, the program code can classify each text passage in an un-reviewed document by applying both implicit and explicit feedback. Utilizing this feedback, in embodiments of the present invention, the program code summarizes and presents users with most relevant parts of a document, so that a user and/or additional system can quickly extract information.

While some existing document data extraction solutions are tied to content of documents (e.g., using software to highlight repetitive text in a document to highlight concepts of importance), embodiments of the present invention determine importance of data comprising documents based on monitoring and analyzing user interactions with documents. Embodiments of the present invention include program code executing on one or more processors that provides data summarization for documents (providing inputs into the aforementioned AI systems for model training) based on personalized observations of document engineers. Some embodiments of the present invention include program code that obtains data based on monitoring individual user's interactions with documents while the individual user reviews/reads the documents, as the program code can determine a relative importance of content of a portion of a given document based on the time spent by the user reading the portion of the document. The data gleaned from a given user to determine the importance of portions of documents is personalized because different users could spend different amounts of time in reviewing various sections of the document and when contrasted with the individual behaviors of the user, the program can determine a relative importance of a given section. In some embodiments of the present invention, the program code determines that a user has spent a given amount of time on a section of a document, including, for example, specific words in the document, based on utilizing sensors to track the physical behaviors of the user. Tracking the physical behaviors of the user can include, but is not limited to, tracking eye movements, mouse movement (e.g., screen scrolling), pupil dilation (as this can indicate a level of attention in certain parts of the text of a document), facial expression, heartbeat, and/or skin conductance, etc. The program code weighs the importance of document content based, in part, on the time an individual user spends reviewing this content.

In some embodiments of the present invention, the program code tracks the physical behaviors of the user (eye movements, mouse movement (e.g., screen scrolling), pupil dilation (as this can indicate a level of attention in certain parts of the text of a document), facial expression, heartbeat, and/or skin conductance, etc.) of a user (e.g., a document engineer), over time, as the user engages with (e.g., reads, reviews) various documents. The program code, through repetition of the observations (e.g., as provided by vision-based eye tracking) learns the timing of the user's review of documents and can thus develop thresholds that indicate a larger than average amount of time spent by the user on a given portion (e.g., section, page, paragraph, word, etc.). The program code utilizes this timing to predict, based on the time the user spends on the portion, the importance of the content of the portion. The program code utilizes the user's reading behaviors over time to train a machine learning algorithm such that the algorithm can be utilized moving forward. For example, once the user's attentions over a small collection of words are known, the program code can utilize the machine learning algorithm to predict the user's attention over every word in the document through word semantics analysis. In some embodiments of the present invention, based on applying the tuned algorithm the program code summarizes documents according to user attention on every section, including, in some embodiments of the present invention, to the granular level of every individual word, in the document. Thus, embodiments of the present invention generate and tune a machine learning algorithm for user-oriented document summarization.

Embodiments of the present invention are inextricably linked to computing. The computer-implemented method, computer program product, and computer systems described herein utilize vison tracking hardware and software to monitor a user's physical behaviors over time and during specific tasks (e.g., reading documents), while simultaneously digesting the content of the document to determine how the physical behaviors coordinate with the content. For example, the program code can determine how long a user spends reading a given word in a given document. In embodiments of the present invention where one or more sensors are utilized by the program code to monitor eye movement, the monitoring of the eye movements and the coordination of the eye movements with the content are accomplished through the use of software and hardware systems, including but not limited to, sensors, including sensors in specific positions to allow monitoring of both the a given document and a reader's eye movements while interacting with granular elements of the document. This functionality is enabled by computer systems and therefore is inextricably linked to computing.

Aspects of some embodiments of the present invention provide a practical application in providing an efficient and accurate approach to processing dense caches of documents for central themes, motifs, subjects, attributes, etc. As discussed herein, embodiments of the present invention generate and update an algorithm, based on personalized physical behavior and/or movement tracking, including but not limited to, eye tracking, during document review. By applying this algorithm, program code in embodiments of the present invention can predict the importance of granular elements in massive caches of documents, including the words themselves. The results produced by the program code in embodiments of the present invention can be utilized by additional computing systems, including AI systems. Because the program code generate a machine-learning algorithm to predict important elements in documents, embodiments of the present invention can extract, through this prediction, important portions (themes, attributes, motifs, subjects, etc.) much faster than the manual processing of document engineers and also faster and arguably more accurately than existing systems that focus on automated document analysis.

Aspects of some embodiments of the present invention represent significant improvements over existing methods of document content analysis. As mentioned above, generally, the type of document analysis described herein in an expensive and manual process performed by individuals referred to as document engineers. They read multiple documents and summarize the important contents. Other systems exclude reader/human engagement with the documents and perform optical character recognition and automated textual content analysis. This approach excludes the input of the document engineers entirely. Embodiments of the present invention preserve the expertise and input of the document engineers while introducing efficiencies that are afforded by using the wholly automated text analyses. Thus, unlike in existing systems, embodiments of the present invention provide a high quality document summarization process that utilizes expert (document engineer) input, without the cost and time investment this expertise usually necessitates.

FIG. 1 is a workflow 100 that illustrates certain aspects of some embodiments of the present invention. Embodiments of the present invention include computer-implemented methods, computer program products, and computer systems where program code executing on at least one processor provides document summarization using cross-domain knowledge relationships and user feedback. As used herein, in some examples of embodiments of the present invention, the word "domain" refers to an area of knowledge, which in enterprise document analysis could include, but is not limited to, health, finance, energy, mining, subjects and/or fields in various industries, and/or subfields in these industries. To that end, as illustrated in FIG. 1, the program code generates (and continuously updates) a (e.g., cross-domain) an object, including but not limited to a knowledge relationship graph. The object comprises a collection of explicit and implicit human feedback that the program code utilizes to summarize and to present to users (and to additional computing system) the most relevant parts of a document, which have not been manually read/reviewed by the user.

Referring to FIG. 1, in some embodiments of the present invention, program code obtains, from sensors monitoring both a user's behavior when interacting with documents, over time, and the data from the coordinating portions of the documents with which the user is interacting during the monitored behaviors, behavioral feedback data of the user (110). The program code generates, based on the behavioral feedback data, a model profile which includes an indication of portions of the documents upon which the user focuses, during the review, for above a threshold amount of time (120). In some embodiments of the present invention, the program code can collect this data over a given amount of time and/or over a given amount of documents, such that the data provided to the program code enables the program code to generate a model profile that reflects when a user is spending above a threshold amount of time on a given passage/portion of a given document. The threshold varies across different users, as this is a personalized analysis. Thresholds established by the program code in embodiments of the present invention can be a static amount of time and/or a relative amount of time when compared to the timing of the reading of a whole of a document by the user. In some cases, if a user spends more than six seconds focusing on a sentence, that sentence is of import, based on the user behavior. In some embodiments of the preset invention, a threshold comprises 0.05% more time spent on a given sentence in the document than any other sentence in the document.

As understood by one of skill in the art, although the user can build an initial model profile with a given amount of data, the program code can continuously update the model profile as the user continues to interact with documents. For example, an initial model profile can be generated by the program code based on the review of a small number of documents (e.g., 10). However, should the user continue to review documents, the program code can update and tune the user-behavior-based model profile, generated by the program code. In some embodiments of the present invention, the model profile is granular such that it includes references to which text (e.g., paragraphs, sentences, words, etc.) were of particular interests to the user (i.e., the user viewed, based on physical behavior and/or movement tracking, for above an established threshold amount of time). In some embodiments of the present invention, the program code applies the model to texts within the same domain as the documents that the user read/reviewed when the program code obtained the intrinsic feedback. Thus, the program code can update the model with additional similar phrases from other documents in the domain based on the importance of similar phrases to the user, as determined by applying the model, as informed by the intrinsic analysis.

Returning to FIG. 1, in some embodiments of the present invention, the program code identifies text passages similar to the portions of the documents in the model profile from documents that the user has not reviewed/read (130). The documents that have not been reviewed can be sourced/obtained from a different domain than the documents utilized by the program code to generate the model profile. In some embodiments of the present invention, in the program code can utilize functionality, including application programming interfaces (APIs) of existing cognitive agents in order to identify text passages in the un-reviewed documents. One such cognitive agent, provided here by way of example, only, and not to imply any limitations, is IBM Watson®, which the program code in some embodiments of the present invention can utilize as a cognitive agent to perform one or more of the described analyses. IBM Watson® is a product of International Business Machines Corporation. IBM Watson® is a registered trademark of International Business Machines Corporation, Armonk, N.Y., US. In embodiments of the present invention, the program code interfaces with IBM Watson® APIs to perform analyses of the un-reviewed documents to identify text passages similar to the portions of the documents in the model profile from documents that the user has not reviewed/read (130). APIs of IBM Watson® that can be utilized in various embodiments of the present invention to perform the described analyses include, but are not limited to, natural language classifiers, Retrieve and Rank (i.e., a service available through the IBM Watson® Developer Cloud that can surface the most relevant information from a collection of documents), Tone Analyzer, concepts/visual insights, trade off analytics, document conversion, relationship extraction, natural language processing, and/or translation.

In some embodiments of the present invention, the program code prompts a user (e.g., through a graphical user interface generated by the program code), to verify that the identified text passages similar to the portions of the documents in the model profile are similar to the portions of the documents (140). In other embodiments of the present invention, the program code determines the similar portions without user feedback. However, the involvement of the user in verifying the similarities can provide an additional level of intelligence and train the program code to identify similarities in content (e.g., words, phrases, sentences, passages, etc.) more accurately in the future. As aforementioned, because the initial documents from which the model profile was generated by the program code can be based on documents from a different domain that the new documents, in some embodiments of the present invention, the program code prompts the user to identify similarity that can be specific to the different domains. For example, a phrase in a first domain could be equivalent to a different phrase in another domain.

Returning to FIG. 1, the program code obtains feedback, responsive to the prompts, user input (via the GUI) verifying the similarities of the passages across the reviewed and un-reviewed documents (140). In some embodiments of the present invention, the program code limits the values the user can return to identify whether a connection exists, including but not limited to, providing a static number of feedback choices (e.g., similarly relevant, similarly irrelevant, and not similar). The program code generates and/or updates an object in memory with the relationship information (150). In some embodiments of the present invention, the program code updates the object with new information from this particular analysis, as the object already exists and can be progressively updates for greater accuracy. In some embodiments of the present invention, the object is a knowledge relationship graph and from the received feedback, the program code inputs new cross-domain information into the graph. In some examples of a knowledge graph generated and maintained by the program code in embodiments of the present invention, text passages are related in the knowledge relationship graph and suggestions are improved using examples.

In embodiments of the present invention, the program code can classify each text passage in an un-reviewed document by applying both implicit and explicit feedback. The implicit feedback is the intelligence (and model profile) gained from observing a user reading/reviewing documents (e.g., 110), and the explicit feedback is the user feedback (e.g., 140), which the program code utilizes to update the object (e.g., knowledge graph). In some embodiments of the present invention, the program code classifies and summarizes the documents utilized to collect the explicit feedback. However, in some embodiments of the present invention, as illustrated in FIG. 1, the program code utilizes the implicit and the explicit feedback to classify and summarize one or more new documents.

Figure 7:
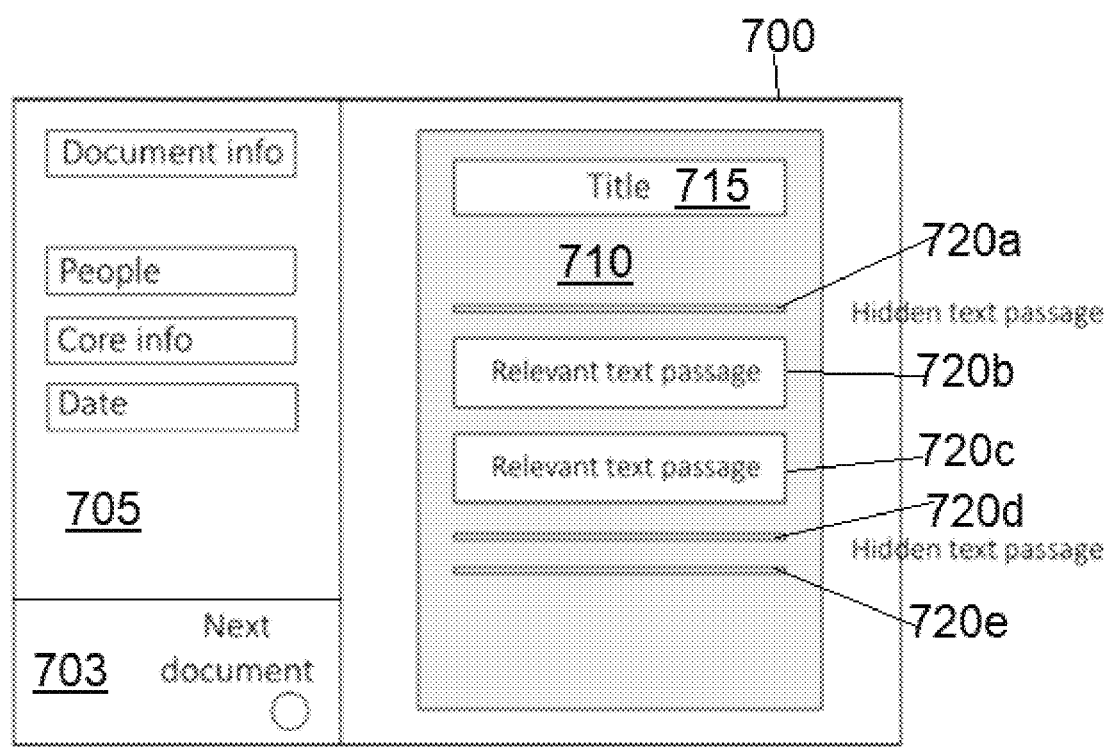
FIG. 7 depicts an example of an object generated and updated by the program code in certain embodiments of the present invention.

Returning to FIG. 1, the program code obtains a new document (160). In embodiments of the present invention, the program code classifies designated portions (e.g., each text passage, each word, etc.) in the new document based on the model profile (170). The program code classifies designated portions in the new document based on the object (180). The program code combines the classifications from the model profile and the object to summarize the document by ranking a most confident classifications (185). The program code generates a summary for the new document (190). FIG. 7 is an example 700 of a summary document, as displayed by the program code in a user interface in some embodiments of the present invention. As will be discussed herein, in some embodiments of the present invention, a summary of a document is a rendering of the document, by the program code, where the program code hides parts of the document that are classified as not relevant to the user performing a task of understanding the document. In some embodiments of the present invention, rather than changing sentences in text of a document to summarize the document, the program code, in rendering the document, hides what it determines to be unnecessary portions of the original document. By hiding these portions, the text of the document fits more easily on the screen of the user interface.

In some embodiments of the present invention, the program code presents the summary to the user, visually, and in some embodiments of the present invention, the program code automatically inputs the summary into an AI system for further analysis. In some embodiments of the present invention, as part of the classification before the summarization, the program code classifies the aforementioned designated portions of the new document based on classifications in another domain. (In some embodiments of the present invention, a model profile can be domain specific.)

Figure 2:
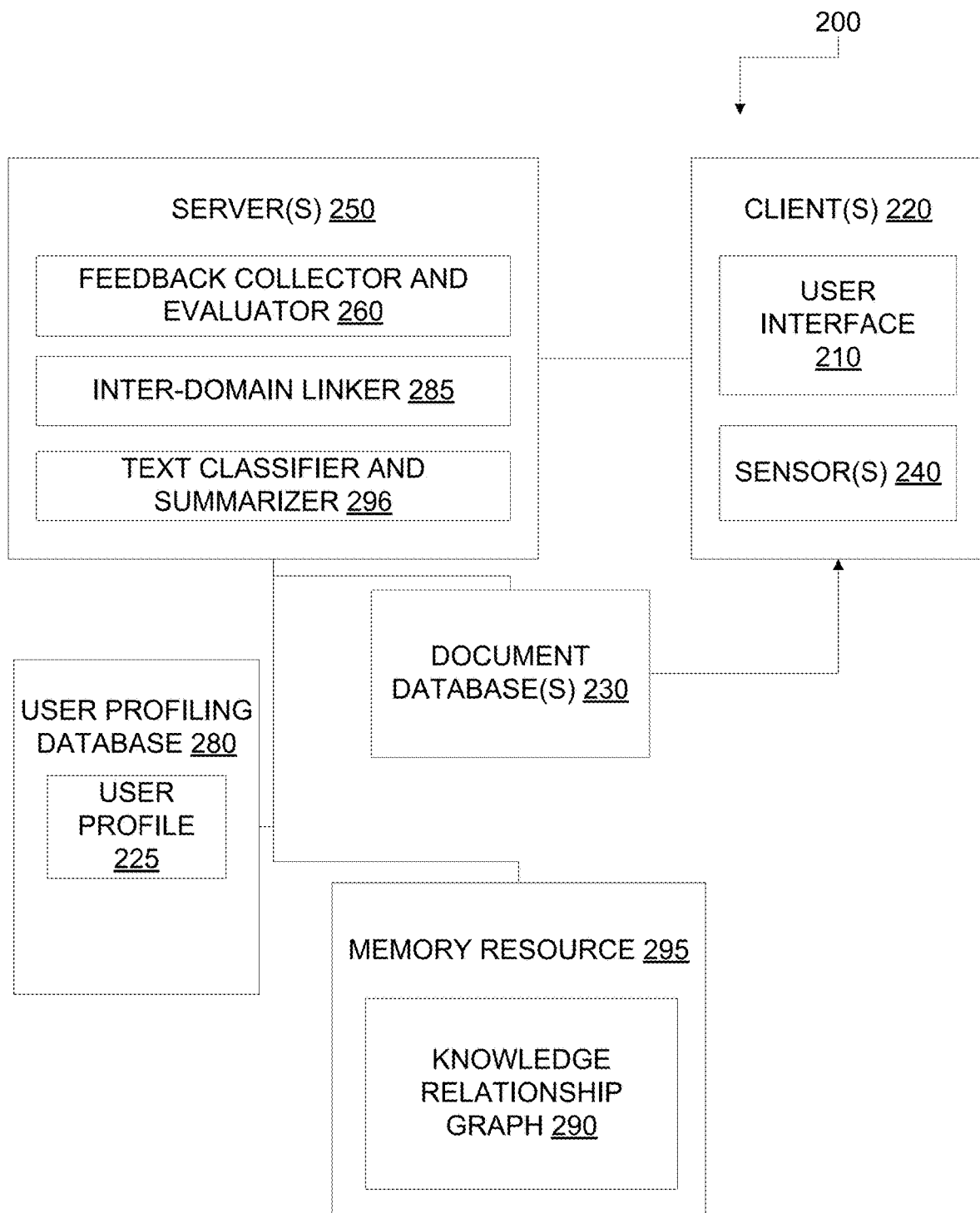
FIG. 2 depicts a technical environment into which aspects of the present invention can be implemented.

FIG. 2 is an illustration of aspects of a technical architecture 200 (e.g., computing infrastructure) into which aspects of the present invention can be implemented. For illustrative purposes only, in FIG. 2, certain functionalities of the program code (executed by one or more processors of at least one server 250) are separated into modules. The program code itself can be comprised of one or more modules and the depiction in this figure is provided to assist in comprehension and not to impose any limitations upon the program code. As illustrated in FIG. 2, the technical architecture includes a user interface 210, aforementioned as a GUI, generated by on one or more clients 220, by the program code, which is executed by one or more processors of at least one server 250. Through the user interface 210, the program code can present the user with documents, solicit feedback on portion similarities identified by the program code (through the aforementioned implicit analysis), and/or provide the user with results (i.e., document summaries).

The analyses performed by the program code in some embodiments of the present invention utilizes a combination of implicit and explicit feedback from users. In addition to collecting explicit feedback from users, via the user interface 210, as discussed in FIG. 1, the program code also generates implicit feedback based on document review accomplished by the user. In embodiments of the present invention, the user accesses various documents from one or more document databases 230, which store one or more documents, for review, by the user, via the user interface 210. Upon review of the documents, one or more sensors 240, which are communicatively coupled to one or more processors upon which the program code executes, track physical behaviors of the user relative to the images of the documents that are rendered in the user interface 210. Tracking the physical behaviors of the user can include, but is not limited to, tracking eye movements, mouse movement (e.g., screen scrolling), pupil dilation (as this can indicate a level of attention in certain parts of the text of a document), facial expression, heartbeat, and/or skin conductance, etc. Based on the data from the one or more sensors 240, the program code determines the amount of time that the focused on given granular portions (phrases, sentences, paragraphs, words, pages, etc.) of the text of the document rendered in the user interface 210. For example, in embodiments of the present invention where eye tracking is utilized, the program code can make this determination based on the amount of time the user's eyes are on a given portion of a document. The program code obtains this timing data from the one or more sensors 240. In some embodiments of the present invention, the one or more sensors 240 are communicatively coupled and/or executing on the one or more clients 220.

The program code of the present invention that obtains and interprets timing data from the sensors is illustrated in FIG. 2 as a feedback collector and evaluator module 260, which is executed by one or more processors of at least one server 250. The program code of the feedback collector and evaluator module 260 collects behavioral feedback from users (via the sensors 240) to classify text passages by importance, based on the amount of time that the user looks at the content of these text passages. The timing can be personalized to a user, e.g., five seconds on a passage can be significant for a given user but insignificant for another user. Thus, the program code of the feedback collector and evaluator module 260 can rank the contents of a given document by importance, down to the wording, based on this implicit feedback (the observational data from the sensors). The program code generates a model profile 225 for the user based on this data. In some embodiments of the present invention, the profile generated by the program code includes: 1) data indicating text portions of importance to the user; and 2) what user behaviors (vison-tracking-wise) indicate the importance of text, based on historical behaviors of the user. The second portion of the profile enables the program code to identify passages of importance for documents reviewed by the user, possibly in different domains, going forward. In the technical architecture 200 of FIG. 2, the program code stored the model profile 225 for each user in a user profiling database 280 accessible to the one or more processors. In some embodiments of the present invention, the program code can update the model by comparing text determined important, based on the intrinsic feedback analysis, with text in other documents from the same domain. The program code can update the model with similar text from other documents from the same domain.

Once the program code of the feedback collector and evaluator module 260 generates the model profile 225 from the implicit feedback, the program code solicits explicit feedback to utilize in automatically summarizing the contents of documents (e.g., providing a result that includes a statement of the main points). Thus, in some embodiments of the present invention, program code depicted in FIG. 2 as being part of an inter-domain linker module 285 obtains a group of additional documents from the one or more document databases 230. These additional documents can be from a different domain than the documents the user analyzed during to produce the implicit feedback. The program code of the inter-domain linker module 285 utilizes the model profile from the user profiling database 280 to identify, in the additional documents portions (e.g., text passages) similar to the portions of the documents in the model profile from documents that the user has not reviewed/read. The program code of the inter-domain linker module 285 provides the identified linkages to a user via the user interface 210 to enable to user to verify the automatically identified similarities. In some embodiments of the present invention, the program code provides the user with options through the user interface 210 to utilize in grouping the linkages (e.g., similarly relevant, similarly irrelevant, and not similar). Upon obtaining this explicit feedback from the user, via the user interface 210, the program code of the inter-domain linker module 285 generates or updates an object, in this example, a knowledge relationship graph 290. The program code stores the knowledge relationship graph 290 (that was generated or updated) in a memory resource 295 accessible to the program code. The memory resource 295 can include be in the same physical and/or virtual resources as the one or more document databases 230. In some embodiments of the present invention the knowledge relationship graph 290 stores graph stores the relationship of text passages between domains.

Based on the implicit feedback and the explicit feedback, the program code can classify and summarize new documents (which can also be obtained by the program code from the one or more document databases 230). FIG. 2 depicts this functionality as program code included is a text classifier and summarizer module 296. The program code of the text classifier and summarizer module 296 classifies relevant or irrelevant text passages and summarize the documents. As depicted in FIG. 1, in some embodiments of the present invention, to classify and summarize documents, the program code classifies designated portions (e.g., each text passage, each word, etc.) based on the model profile in the user profiling database 280 (e.g., FIG. 1, 160). The program code classifies designated portions in the documents based on the knowledge relationship graph 290 (e.g., FIG. 1, 170). The program code combines the classifications from the model profile 225 in the user profiling database 280 and the knowledge relationship graph 290 to summarize documents by ranking a most confident classification (e.g., FIG. 1, 180). The program code generates a summary for the new document (e.g., FIG. 1, 190). The program code can provide the summary of each document automatically classified and summarized to the user via the user interface 210.

Figure 3:
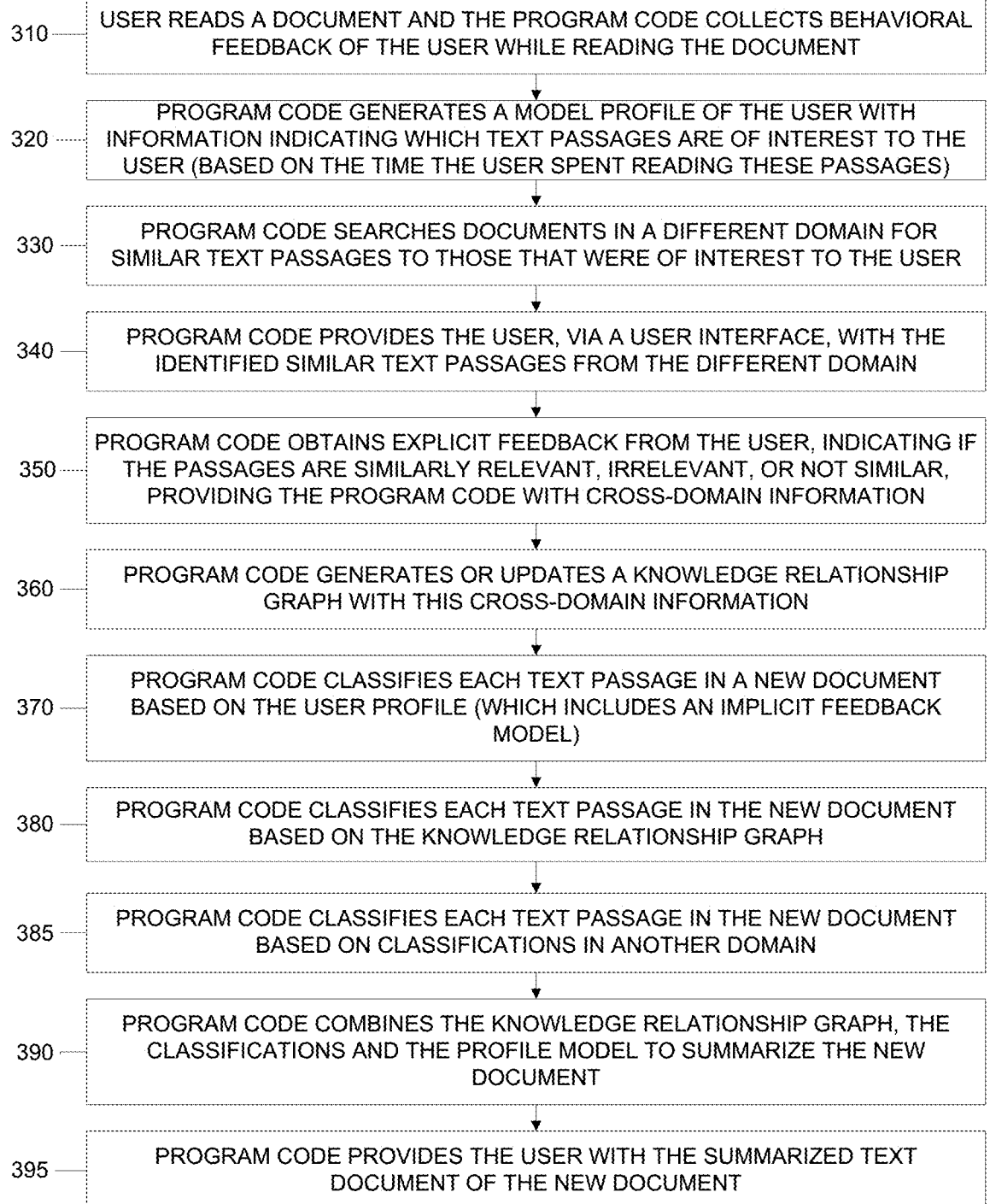
FIG. 3 is a workflow that illustrates certain aspects of some embodiments of the present invention.

FIG. 3 is a workflow 300 illustrating certain aspects of some embodiments of the present invention where documents which are utilized to obtain implicit feedback are in a different domain then those utilized to obtain explicit feedback, as well as subsequent documents automatically summarized by the program code in embodiments of the present invention. FIG. 3 also illustrates certain aspects from a user perspective. Thus, FIG. 3 illustrates the cross-domain functionality of some embodiments of the present invention.

In some embodiments of the present invention, a user reads a document and the program code collects behavioral feedback of the user while reading the document (310). To collect this implicit user feedback, the program code provide the user with a platform to read documents while the program code collects this feedback. In some embodiments of the present invention, the program code collects this feedback through using physical movement tracking system to collect data about the areas of focus of the reader/user, measuring the time spent by the user on each text passage and the user's inputs (e.g., selections/clicking behavior). The program code utilizing sensors to track the physical behaviors of the user, which can include, but is not limited to, tracking eye movements, mouse movement (e.g., screen scrolling), pupil dilation (as this can indicate a level of attention in certain parts of the text of a document), facial expression, heartbeat, and/or skin conductance, etc. The program code correlates the feedback with the most relevant text passages of interest to the user in the domain.

Figure 4:
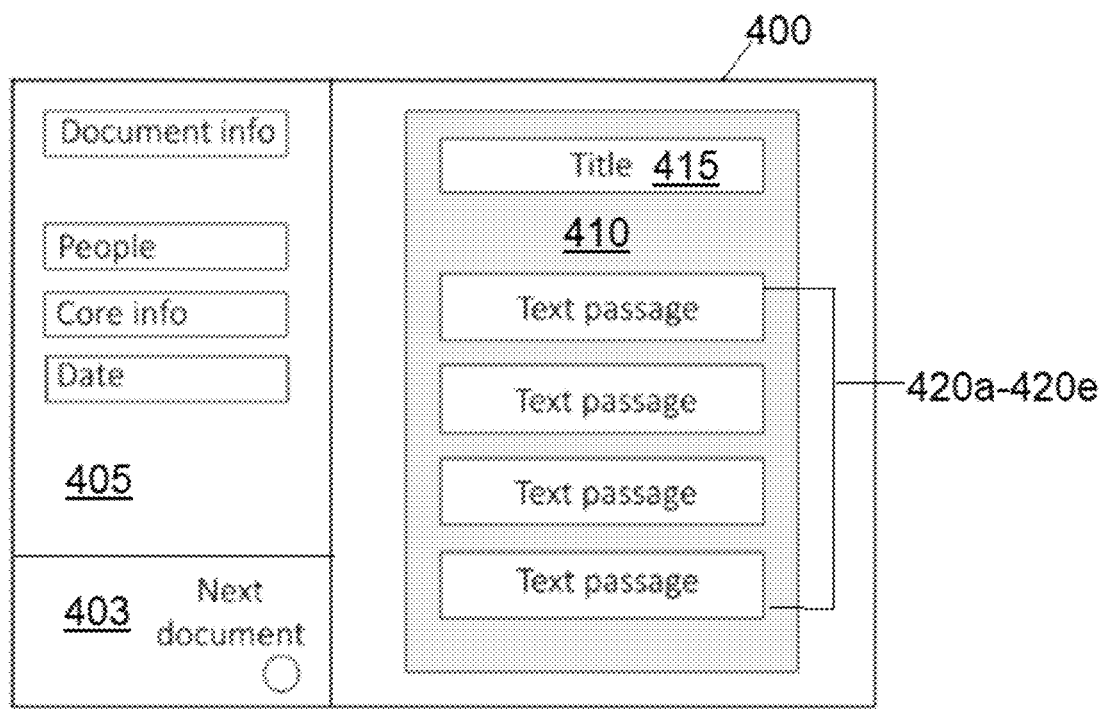
FIG. 4 is an example of the graphical user interface (GUI) that can be generated by program code in some embodiments of the present invention.

FIG. 4 is an example of a GUI 400 in document review platform. In the example, the user can view certain aspects of the document 410, including a title 415 text passages 420a-420e, as well as certain metadata 405, as provided in the GUI 400 of the document review platform. The user also has the option 403 of moving to the next document.

The program code generates a model profile of the user with information indicating which text passages are of interest to the user (based on the time the user spent reading these passages) (320). As discussed in reference to FIGS. 1-2, the program code generates a model profile of the user with information of which text passages are of interest to the user. In some embodiments of the present invention, the program code utilizes the model to itself to identify similarities of any text passages with the text passages of interest in the domain given domain of the one or more documents from which the intrinsic feedback was collected by the program code. The program code stores the model in a user profiling database, as illustrated in FIG. 2.

Figure 5:
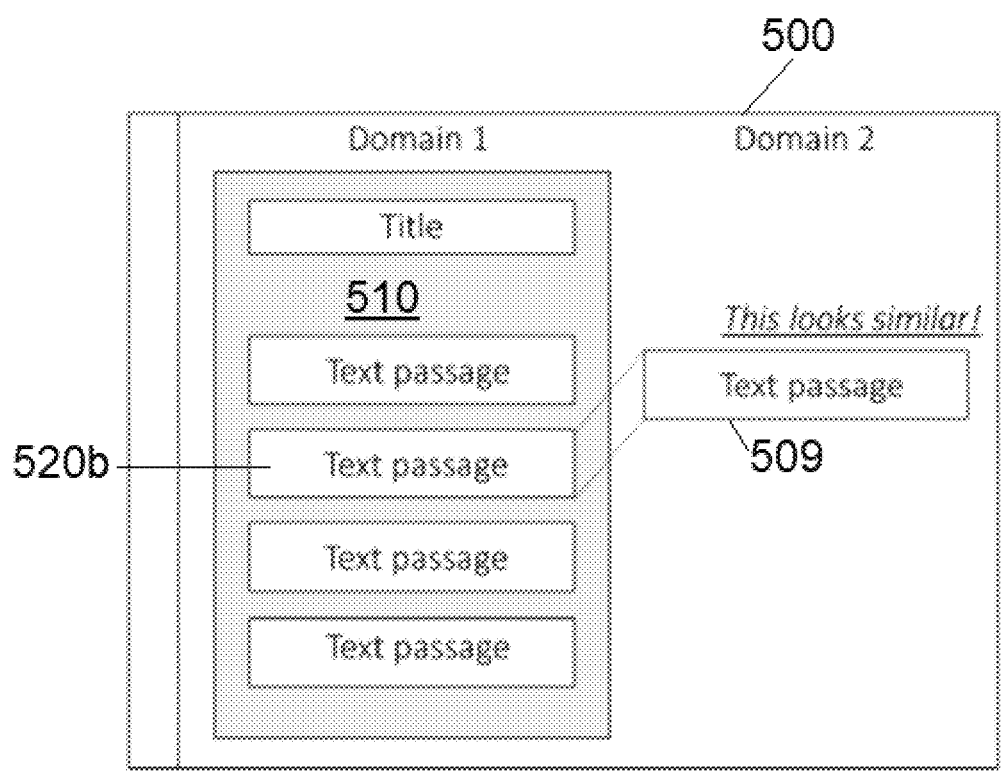
FIG. 5 is an example of the graphical user interface (GUI) that can be generated by program code in some embodiments of the present invention.

The program code searches documents in a different domain for similar text passages to those that were of interest to the user (330). The program code provides the user, via a user interface, with the identified similar text passages from the different domain (340). FIG. 5 illustrates a GUI 500 where a similar text passage 509 is suggested to a user, as being similar to a text passage 520b, in accordance with certain aspects of some embodiments of the present invention. In FIG. 5, the program code presents the user with one or more similar text passages from a different domain, suggesting the one or more text passages from the different domain are similarly relevant or irrelevant. AS illustrated in FIG. 1, the document being displayed 510 is from Doman 1, while the text passage 509 that is suggested, by the program code, as being similar, originates from a document in Domain 2, a different domain. This figure illustrates how the program code solicits explicit feedback to generate cross-domain linkages.

Figure 6:
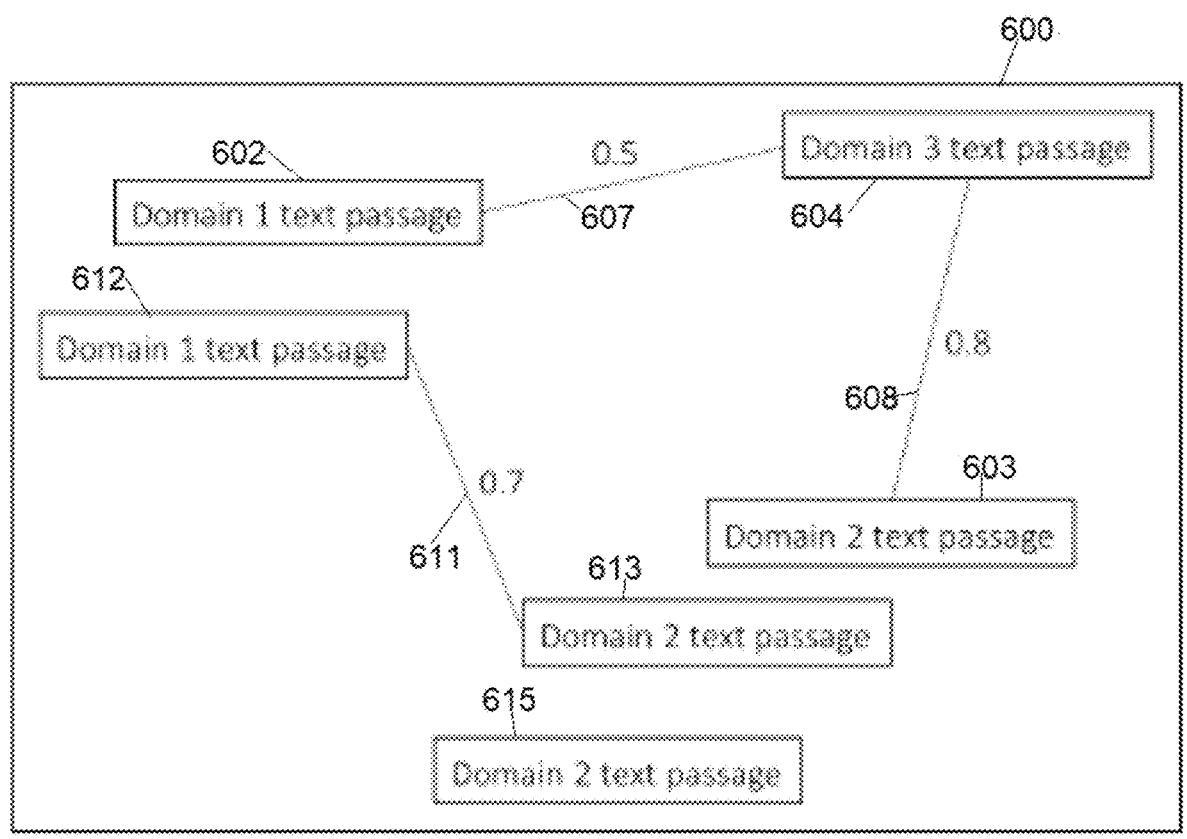
FIG. 6 is an example of the graphical user interface (GUI) that can be generated by program code in some embodiments of the present invention.

The program code obtains explicit feedback from the user, indicating if the passages are similarly relevant, irrelevant, or not similar, providing the program code with cross-domain information (350). For example, in some embodiments of the present invention, the program code obtains explicit feedback indicating that passages are similarly relevant or irrelevant, or not similar (e.g., user interacts giving information about that suggestion, if they are indeed similarly relevant, irrelevant, or not similar). FIG. 6 is an example of a knowledge relationship graph 600 that can be generated/updated/maintained by program code in embodiments of the present invention. The graph 600 depicts the similarity of various text passages across various domains, as determined initially by an automated process and then, through the solicitation of explicit user feedback, by the program code. The suggesting feature of the program code is improved through iterations, based on machine learning. In this example, provided for illustrative purposes only, the relationships 607 608 between certain passages in a first domain 602, a second domain 603, and a third domain 604, are illustrated. A different relationship 611 between other passages 612 613 from the first and second domain is also illustrated. One passage on importance from the second domain 615 is illustrated on not being related to any passages in different domains.

The program code generates or updates a knowledge relationship graph with this cross-domain information (360). The program code classifies each text passage in a new document based on the user profile (which includes an implicit feedback model) (370). The program code infers which text passages are irrelevant or relevant to be shown to user based on its profile model and feedback from physical movement tracking, time and clicking behavior. The program code classifies each text passage in the new document based on the knowledge relationship graph (380). The program code infers which text passages are irrelevant or relevant to be shown to the user, based on the similarity of classified text passages in another domain and related by the knowledge relationship graph. The program code classifies each text passage in the new document based on classifications in another domain (385). The program code infers which text passages are irrelevant or relevant to be shown to the user, based on the similarity of classified text passages between domains, by the similarity of the text. The program code combines the knowledge relationship graph, the classifications and the profile model to summarize the new document (390). For example, in some embodiments of the present invention, the program code by ranks the most confident classification. The program code provides the user with the summarized text document of the new document (395). In some embodiments of the present invention, the user can choose to unhide the content classified by the program code as irrelevant text passages. FIG. 7 is an example of a summarized document 700 as displayed by the program code in embodiments of the present invention. In contrast to the document 410 displayed FIG. 4, the document 710 displayed by the program code in FIG. 7, has only the most important portions of the document 710 visible to the user, through the interface. In this example, certain of the portions 720a, 720d, 720e, have been hidden by the program code based on not being adjudged to be important. Meanwhile, in addition to the title 715, only two portions 720b, 720c, are displayed by the program code, based on importance. In some embodiments of the present invention, the interface 700 generated by the program code provides the user with the ability to un-hide the hidden portions. As with FIG. 4, the user utilizing the summary in the interface can also view the metadata 705 of the document 710 and move to the next document 703.

Embodiments of the present invention include a computer-implemented method, a computer program product, and a computer system where program code utilizes implicit and explicit user feedback to summarize documents. As explained herein, the implicit feedback is the intelligence (and model profile) gained from observing a user reading/reviewing documents (e.g., 110), and the explicit feedback is the user feedback (e.g., 140), which the program code utilizes to update the object (e.g., knowledge graph). In some embodiments of the present invention, the program code executing on one or more processors monitors, via one or more sensors communicatively coupled to the one or more processors, the one or more sensors configured to monitor physical behaviors of a user engaged in reading one or more documents on a user interface of a client communicatively coupled to the one or more processors, the physical behaviors and portions of the one or more processors being read during the physical behaviors. The program code analyzes the physical behaviors and the captured portions to generate implicit feedback indicating amounts of time the user engaged with each portion of the one or more documents during the monitoring. The program code generates a model profile for the user, where the profile comprises relative timing measures indicating ranked levels of engagement of the user with the portions and ranked levels of importance of each portion, where each level of engagement is directly proportional to each level of importance of each portion being reviewed at the level of engagement in a context of the one or more documents.

In some embodiments of the present invention, the program code identifies portions of one or more additional documents, similar to portions of the one or more documents ranked at the highest level of importance in the model profile, to generate proposed linkages between the portions of the one or more documents ranked at the highest level of importance and the identified portions of one or more additional documents. The program code displays, via the client, the linkages, to the user, to solicit explicit feedback from the user regarding accuracy of the linkages. The program code obtains, via the client, the explicit feedback from the user. The program code updates the linkages based on the explicit feedback. The program code generates an object comprising the linkages, where the object comprises the updated linkages.

In some embodiments of the present invention, the program code automatically summarizes a new document, including: obtaining, the new document, utilizing the model profile to classify each portion of the portions comprising the new document, into the ranked levels of importance, where the classifying comprises identifying highest importance level portions of the new documents for the portions comprising the new document defined in the model profile, utilizing, the object to classify each portion of the portions comprising the new document, into the ranked levels of importance, where the classifying comprises identifying highest importance level portions of the new documents for the portions comprising the new document defined in the object, identifying, portions of the new document identified as highest importance level portions by the model profile and the object, and generating, a summary of the new document comprising the portions of the new document identified as highest importance level portions by the model profile and the object.

In some embodiments of the present invention, the program code displays the summary of the new document to the user, via a user interface of the client. This summary can include the portions of the new document identified as the highest importance level portions and links to unhide portions of the new document not identified as highest importance level portions.

In some embodiments of the present invention, the one or more documents are from a first domain and the additional documents are from a second domain. These portions can include textual phrases.

In some embodiments of the present invention, the program code identifies portions of one or more additional documents, similar to portions of the one or more documents ranked at the highest level of importance in the model profile by applying a cognitive agent to identify the similar portions. The cognitive agent can include an application programming interface that performs natural language processing.

In some embodiments of the present invention, the explicit feedback from the user on the linkages comprises an option characterizing each linkage, where the option is selected from the group consisting of: similarly relevant, similarly irrelevant, and not similar. In some embodiments of the present invention, the object is a knowledge relationship graph. Thus, is some embodiments of the present invention, the linkages are selected from the group consisting of: cross-domain linkages and knowledge relationship graph linkages.

In some embodiments of the present invention, the physical behaviors are selected from the group consisting of: eye movement, mouse movement, pupil dilation, facial expression, heartbeat, and skin conductance.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the user profiling database 280, one or more document databases 230, and/or the at least one server 250 can each comprise a cloud computing node 10 (FIG. 8) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
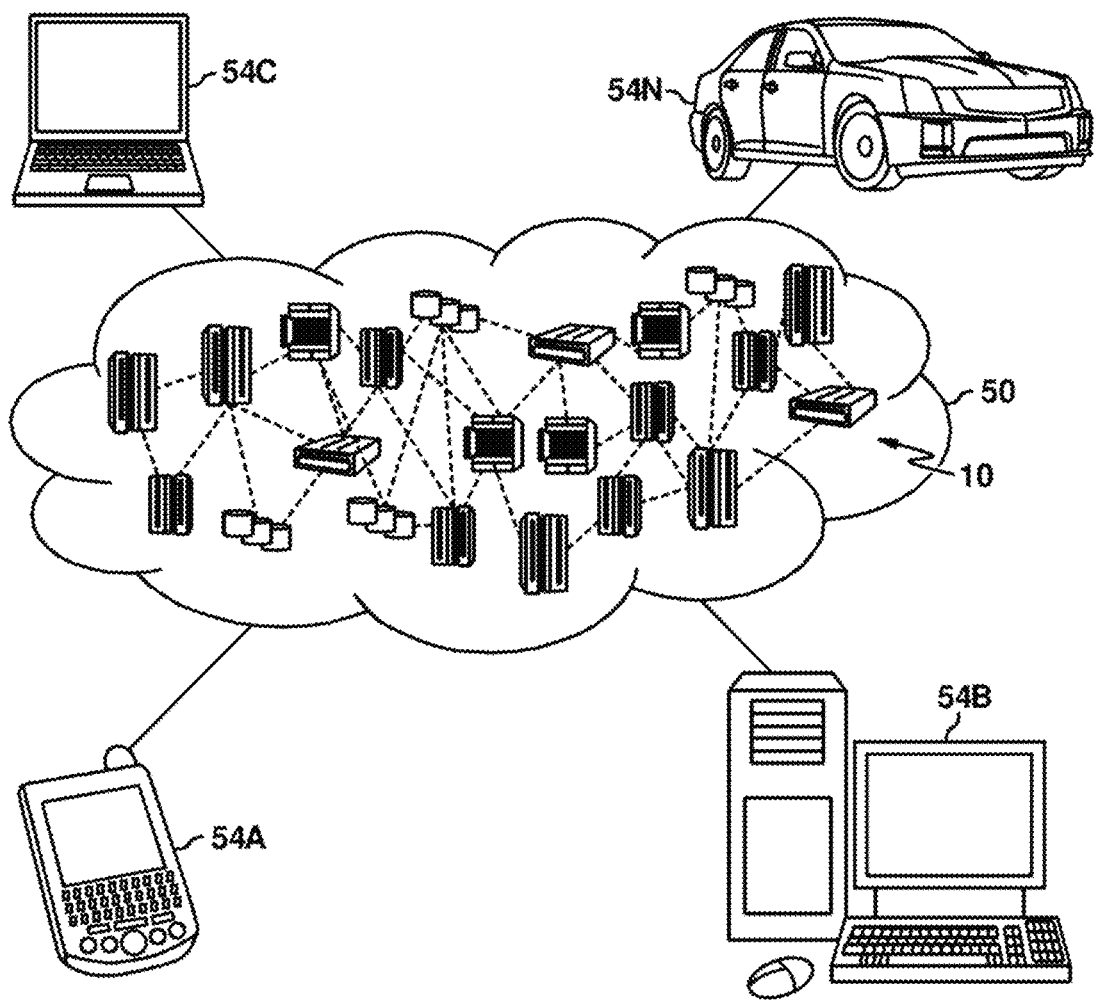
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
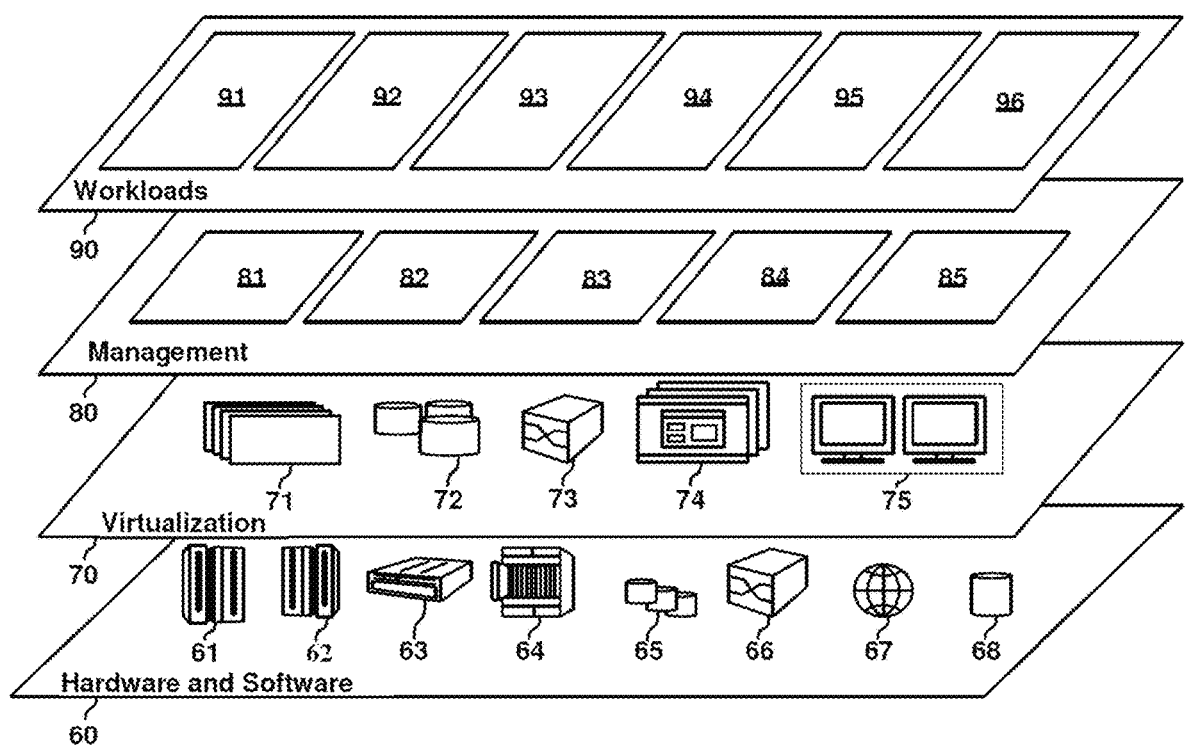
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and; and automatically determining and summarizing core contents of documents in document repositories 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
monitoring, by one or more processors, via one or more sensors communicatively coupled to the one or more processors, the one or more sensors configured to monitor physical behaviors of a user engaged in reading one or more documents on a user interface of a client communicatively coupled to the one or more processors, the physical behaviors and portions of the one or more documents being read during the physical behaviors;
analyzing, by the one or more processors, the physical behaviors and the portions to generate implicit feedback indicating amounts of time the user engaged with each portion of the one or more documents during the monitoring;
generating, by the one or more processors, a model profile for the user, wherein the model profile comprises relative timing measures indicating ranked levels of engagement of the user with the portions and ranked levels of importance of each portion, wherein each level of engagement is directly proportional to each level of importance of each portion being reviewed at the level of engagement in a context of the one or more documents;
identifying, by the one or more processors, portions of one or more additional documents, similar to portions of the one or more documents ranked at the highest level of importance in the model profile, to generate proposed linkages between the portions of the one or more documents ranked at the highest level of importance and the identified portions of one or more additional documents;
displaying, by the one or more processors, via the client, the linkages, to the user, to solicit explicit feedback from the user regarding accuracy of the linkages;
obtaining, by the one or more processors, via the client, the explicit feedback from the user;
updating, by the one or more processors, the linkages based on the explicit feedback;
generating, by the one or more processors, an object comprising the linkages, wherein the object comprises the updated linkages;
obtaining, by the one or more processors, a new document; and
utilizing, by the one or more processors, the model profile to classify each portion of the portions comprising the new document, into the ranked levels of importance, wherein the classifying comprises identifying highest importance level portions of the new documents for the portions comprising the new document defined in the model profile.

2. The computer-implemented method of claim 1, further comprising:
utilizing, by the one or more processors, the object to classify each portion of the portions comprising the new document, into the ranked levels of importance, wherein the classifying comprises identifying highest importance level portions of the new documents for the portions comprising the new document defined in the object;
identifying, by the one or more processors, portions of the new document identified as highest importance level portions by the model profile and the object; and
generating, by the one or more processors, a summary of the new document comprising the portions of the new document identified as highest importance level portions by the model profile and the object.

3. The computer-implemented method of claim 2, further comprising:
displaying, by the one or more processors, the summary of the new document to the user, via a user interface of the client.

4. The computer-implemented method of claim 3, wherein the displayed summary of the new document comprises the portions of the new document identified as the highest importance level portions and links to unhide portions of the new document not identified as highest importance level portions.

5. The computer-implemented method of claim 1, wherein the one or more documents are from a first domain and the additional documents are from a second domain.

6. The computer-implemented method of claim 5, the object comprising a knowledge relationship graph.

7. The computer-implemented method of claim 6, wherein the linkages are selected from the group consisting of: cross-domain linkages and knowledge relationship graph linkages.

8. The computer-implemented method of claim 1, wherein the portions of the one or more documents being read during the physical behaviors comprise textual phrases.

9. The computer-implemented method of claim 1, wherein identifying portions of one or more additional documents, similar to portions of the one or more documents ranked at the highest level of importance in the model profile comprises applying a cognitive agent to identify the similar portions.

10. The computer-implemented method of claim 9, wherein the cognitive agent comprises an application programming interface that performs natural language processing.

11. The computer implemented method of claim 1, wherein the explicit feedback from the user on the linkages comprises an option characterizing each linkage, wherein the option is selected from the group consisting of: similarly relevant, similarly irrelevant, and not similar.

12. The computer-implemented method of claim 1, where the physical behaviors are selected from the group consisting of: eye movement, mouse movement, pupil dilation, facial expression, heartbeat, and skin conductance.

13. A computer program product comprising:
a computer readable storage medium readable by one or more processors of a shared computing environment and storing instructions for execution by the one or more processors for performing a method comprising:
monitoring, by the one or more processors, via one or more sensors communicatively coupled to the one or more processors, the sensors configured to monitor physical behaviors of a user engaged in reading one or more documents on a user interface of a client communicatively coupled to the one or more processors, the physical behaviors and portions of the one or more documents being read during the physical behaviors;
analyzing, by the one or more processors, the physical behaviors and the portions to generate implicit feedback indicating amounts of time the user engaged with each portion of the one or more documents during the monitoring;
generating, by the one or more processors, a model profile for the user, wherein the model profile comprises relative timing measures indicating ranked levels of engagement of the user with the portions and ranked levels of importance of each portion, wherein each level of engagement is directly proportional to each level of importance of each portion being reviewed at the level of engagement in a context of the one or more documents;
identifying, by the one or more processors, portions of one or more additional documents, similar to portions of the one or more documents ranked at the highest level of importance in the model profile, to generate proposed linkages between the portions of the one or more documents ranked at the highest level of importance and the identified portions of one or more additional documents;
displaying, by the one or more processors, via the client, the linkages, to the user, to solicit explicit feedback from the user regarding accuracy of the linkages;
obtaining, by the one or more processors, via the client, the explicit feedback from the user;
updating, by the one or more processors, the linkages based on the explicit feedback;
generating, by the one or more processors, an object comprising the linkages, wherein the object comprises the updated linkages;
obtaining, by the one or more processors, a new document; and
utilizing, by the one or more processors, the model profile to classify each portion of the portions comprising the new document, into the ranked levels of importance, wherein the classifying comprises identifying highest importance level portions of the new documents for the portions comprising the new document defined in the model profile.

14. The computer program product of claim 13, the method further comprising:
utilizing, by the one or more processors, the object to classify each portion of the portions comprising the new document, into the ranked levels of importance, wherein the classifying comprises identifying highest importance level portions of the new documents for the portions comprising the new document defined in the object;
identifying, by the one or more processors, portions of the new document identified as highest importance level portions by the model profile and the object; and
generating, by the one or more processors, a summary of the new document comprising the portions of the new document identified as highest importance level portions by the model profile and the object.

15. The computer program product of claim 14, the method further comprising:
   displaying, by the one or more processors, the summary of the new document to the user, via a user interface of the client.

16. The computer program product of claim 14, wherein the one or more documents are from a first domain and the additional documents are from a second domain.

17. A computer system comprising:
   a memory;
   one or more processors in communication with the memory;
   one or more sensors communicatively coupled to the one or more processors;
   program instructions executable by the one or more processors in a shared computing environment via the memory to perform a method, the method comprising:
      monitoring, by the one or more processors, via the one or more sensors, the one or more sensors configured to monitor physical behaviors of a user engaged in reading one or more documents on a user interface of a client communicatively coupled to the one or more processors, the physical behaviors and portions of the one or more documents being read during the physical behaviors;
      analyzing, by the one or more processors, the physical behaviors and the portions to generate implicit feedback indicating amounts of time the user engaged with each portion of the one or more documents during the monitoring;
      generating, by the one or more processors, a model profile for the user, wherein the model profile comprises relative timing measures indicating ranked levels of engagement of the user with the portions and ranked levels of importance of each portion, wherein each level of engagement is directly proportional to each level of importance of each portion being reviewed at the level of engagement in a context of the one or more documents;
      identifying, by the one or more processors, portions of one or more additional documents, similar to portions of the one or more documents ranked at the highest level of importance in the model profile, to generate proposed linkages between the portions of the one or more documents ranked at the highest level of importance and the identified portions of one or more additional documents;
      displaying, by the one or more processors, via the client, the linkages, to the user, to solicit explicit feedback from the user regarding accuracy of the linkages;
      obtaining, by the one or more processors, via the client, the explicit feedback from the user;
      updating, by the one or more processors, the linkages based on the explicit feedback;
      generating, by the one or more processors, an object comprising the linkages, wherein the object comprises the updated linkages;
      obtaining, by the one or more processors, a new document; and
      utilizing, by the one or more processors, the model profile to classify each portion of the portions comprising the new document, into the ranked levels of importance, wherein the classifying comprises identifying highest importance level portions of the new documents for the portions comprising the new document defined in the model profile.

18. The system of claim 17, the method further comprising:
   utilizing, by the one or more processors, the object to classify each portion of the portions comprising the new document, into the ranked levels of importance, wherein the classifying comprises identifying highest importance level portions of the new documents for the portions comprising the new document defined in the object;
   identifying, by the one or more processors, portions of the new document identified as highest importance level portions by the model profile and the object; and
   generating, by the one or more processors, a summary of the new document comprising the portions of the new document identified as highest importance level portions by the model profile and the object; and
   displaying, by the one or more processors, the summary of the new document to the user, via a user interface of the client.

* * * * *